United States Patent [19]

Kawamura

[11] Patent Number: 4,778,377
[45] Date of Patent: Oct. 18, 1988

[54] DEVICE FOR CONTROLLING FUEL COMBUSTION IN A HEATER

[75] Inventor: Hideo Kawamura, Samukawa, Japan

[73] Assignee: Isuzu Motors Limited, Shinagawa, Japan

[21] Appl. No.: 121,339

[22] Filed: Nov. 16, 1987

[30] Foreign Application Priority Data

Nov. 15, 1986 [JP] Japan ................................ 61-272684

[51] Int. Cl.4 .............................................. F23H 1/00
[52] U.S. Cl. ......................................... 431/41; 431/11
[58] Field of Search .............................. 431/36, 41, 11

[56] References Cited

U.S. PATENT DOCUMENTS 2,286,856  6/1942  Holthouse .................... 431/41 X
4,081,234  3/1978  Mueller ........................ 431/36 X
4,431,401  2/1984  Kunst ........................... 431/36 X Primary Examiner—Edward G. Favors
Attorney, Agent, or Firm—Staas & Halsey

[57] ABSTRACT

A device for controlling fuel combustion in a heater including a burner for combusting fuel heated and atomized by a fuel atomizer detects the condition of fuel combustion in the burner and controls the amount of heat energy applied to the fuel by the fuel atomizer dependent on the detected condition of fuel combustion.

9 Claims, 3 Drawing Sheets

DEVICE FOR CONTROLLING FUEL COMBUSTION IN A HEATER

BACKGROUND OF THE INVENTION

The present invention relates to a combustion control device for a heater, and more particularly to a device for controlling fuel combustion in a heater.

The passenger compartment or cabin of a motor vehicle is generally heated by a heat source employing the cooling water of the internal combustion engine on the motor vehicle. However, in cold weather, it takes time to increase the temperature of the cooling water, and hence the compartment cannot be heated quickly.

Japanese Laid-Open Patent Publication No. 61-157422 discloses a vehicle heater device in which fuel is combusted by a burner separate from the internal combustion engine and heat generated by the fuel combustion is recovered by a heat exchanger to supply heating air to the compartment. In the above-noted vehicle heater device, the burner has an atomizing glow plug for atomizing fuel and an igniting glow plug for igniting atomized fuel. A controller including a bridge circuit and a comparator is employed to control supplied electric power to keep the temperatures of the atomizing glow plug and the igniting glow plug in the burner at respective predetermined temperature levels.

According to the above-noted vehicle heater device, the temperatures of the atomizing and igniting glow plugs are controlled at the respective temperature levels, as described above. The atomizing temperature varies from fuel type to fuel type, and if the temperature of the atomizing glow plug is low when fuel of a high atomizing temperature is used, the fuel may not be sufficiently atomized, and a combustion failure may result.

SUMMARY OF THE INVENTION

It is an object of the present invention to provide a device for controlling fuel combustion in a heater by controlling the amount of heating energy in a fuel atomizer dependent on the type of fuel used, so that fuels of different atomizing temperatures can well be atomized for good fuel combustion.

According to the present invention, there is provided a device for controlling fuel combustion in a heater including a burner having a fuel atomizer for heating and atomizing fuel and igniting means for igniting the fuel atomized by the fuel atomizer, the device comprising a flame sensor for detecting the condition of fuel combustion in the burner, and control means for controlling the amount of heating energy for heating fuel in the fuel atomizer based on a signal from the flame sensor.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
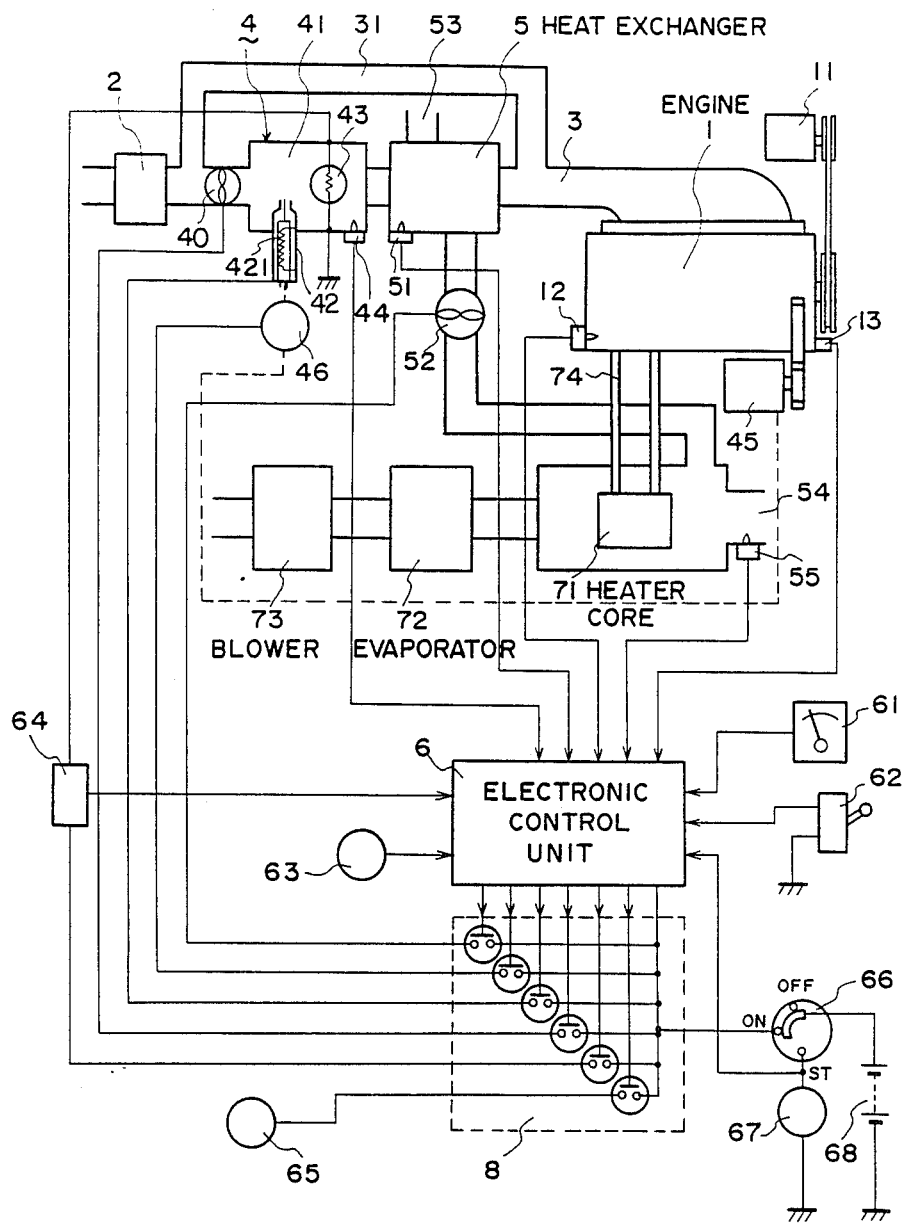
FIG. 1 is a schematic view of a control device for a heater according to the present invention.

As shown in FIG. 1, an internal combustion engine 1 has an intake pipe 3 serving as an air duct for introducing air from an air cleaner 2 into the engine 1. In the intake pipe 3, there are disposed a burner 4 for combusting fuel and a heat exchanger 5 positioned downstream of the burner 4 in the direction in which air flows through the intake pipe 3. The intake pipe 3 is bypassed by a bypass pipe 31 which directly introduces air from the air cleaner 2 to the internal combustion engine 1 in bypassing relation to the burner 4 and the heat exchanger 5.

A combusting air blower 40 is disposed at the entrance of the burner 4 for supplying combusting air into the burner 4.

The burner 4 has a combustion chamber 41, a fuel atomizer 42 extending from the bottom of the combustion chamber 41 toward the center of the combustion chamber 41, and an igniting glow plug 43 disposed in the combustion chamber 41 for igniting fuel as atomized by the fuel atomizer 42.

The fuel atomizer 42 houses therein an atomizing glow plug 421 in the form of a pipe or a rod made of a ceramic material such as silicon nitride ($Si_2No_4$) for heating and atomizing fuel. The atomizing glow plug 421 has a resistance wire of a positive temperature coefficient of resistance which is embedded centrally therein.

The igniting glow plug 43 is in the form of a rod made of a ceramic material such as silicon nitride ($Si_2No_4$) and has a centrally embedded esistance wire of a positive temperature coefficient of resistance.

The condition of fuel combustion in the combustion chamber 41 is detected by a flame sensor 44 having a resistance wire of a positive temperature coefficient of resistance. The temperature of fuel combustion, i.e., the condition of fuel combustion can be detected by an electronic control unit (described later on) which reads a signal from the flame sensor 44.

Fuel is supplied to the burner 4 by a fuel pump 45 and a fuel control valve 46 through the fuel atomizer 42, and is heated and atomized by the atomizing glow plug 421. The atomized fuel is then ejected into the combustion chamber 41. The rate of supply of the fuel is controlled by a command signal from an electronic control unit 6 which controls the duty cycle of the fuel control valve 46 to open and close the same. An electric current supplied to the atomizing glow plug 421 is controlled in its duty cycle by a command signal from the electronic control unit 6. The temperature to which the atomizing glow plug 421 is heated can be controlled according to the atomizing performance of the fuel.

Air introduced from an air inlet 53 into the heat exchanger 5 and heated by the heat recovered by the heat exchanger 5 is delivered by a hot air blower 52 from an air oulet 54 into the cabin of the motor vehicle. A temperature sensor 51 is attached to the heat exchanger 5 for detecting the temperature therein. A hot air temperature sensor 55 is diosposed in the air outlet 54 for detecting the temperature of hot air. Signals from these temperature sensors are applied to the electronic control unit 6.

Operation with respect to the burner 4 and the heat exchanger 5 will be described below. Fuel supplied from the fuel pump 45 via the fuel control valve 46 to the fuel atomizer 42 is atomized by the atomizing glow plug 421 which has been heated by electric energization, and the atomized fuel is ejected into the burner 4. The atomized fuel is mixed with air which has been supplied from the air cleaner 2 by the blower 40 to produce a combustible air-fuel mixture. The combustible air-fuel mixture is then ignited by the energized igniting glow plug 43 into flames which turn into high-temperature combusted gasses that are delivered to the heat exchanger 5. In the heat exchanger 5, air introduced from the air inlet 53 is heated by the heat of the combusted gasses, and the heated hot air is discharged via the outlet 54 into the cabin to heat the interior thereof.

A heater core 71 is connected to the internal combustion engine 1 by a hot water passage 74, an evaporator 72, and a blower 73 for the heater core 71. These members are components of a conventional heating and air-conditioning apparatus employing the temperature of cooling water.

11 is generator driven by the engine a water temperature sensor 12 detector the temperature of the cooling water, 13 a load sensor 13 detects the load condition of the engine an ambient or atmospheric air temperature sensor 63 detects ambient air temperature. Detected signals from the water temperature sensor 12, the load sensor 13, and the atmospheric temperature sensor 63 are applied to the electronic control unit 6.

The electronic control unit 6 is composed of a microcomputer comprising a central processing unit for effecting arithmetic operations and counting operating time based on read signals, various memories for storing the results of arithmetic operations and a control program for efficiently controlling the burner, and input/output devices for receiving various read signals and issuing commands to the operating mechanisms. The electronic control unit 6 is connected to the flame sensor 44, the heat exchanger temperature sensor 51, the water temperature sensor 12, the hot air temperature sensor 55, the load sensor 13, a heating position switch 61, an operation switch 62, the temperature sensor 63 for detecting atmospheric temperature, a plug resistance detector 64, and others for receiving input signals from these sensors and switches. The plug resistance detector 64 is disposed in a circuit for energizing the igniting glow plug 43 and detects the temperature of the igniting glow plug 43 from the resistance value thereof which has resistance-dependent temperature characteristics by measuring the current passed through the igniting glow plug 43.

The electronic control unit 6 is also connected to a switch device 8 for controlling the various operating mechanisms and applies control commands through the switch device 8 to the hot air blower 52, the fuel pump 45, the atomizing glow plug 42, the combusting air blower 40, the igniting glow plug 43, and an emergency switch 65.

Numerals 66, 67, and 68 refer to a key switch, a starter motor, and a battery, respectively. When the key switch 66 is turned to a start position, the starter motor is energized to start the engine 1, and a start signal is applied to the electronic control unit 6.

Figure 2:
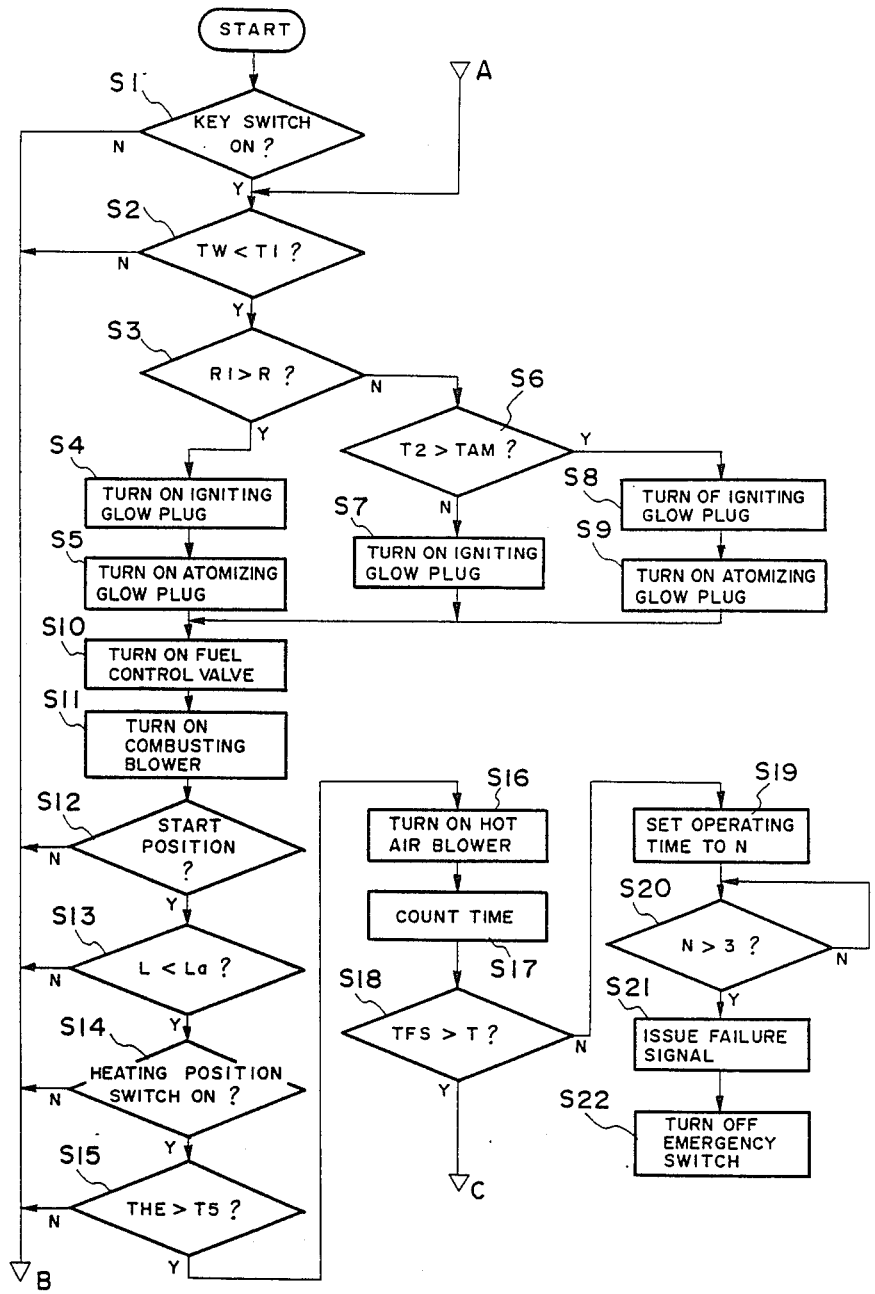
FIGS. 2(A) and 2(B) are a flowchart of a control sequence of the control device.
Figure 2:
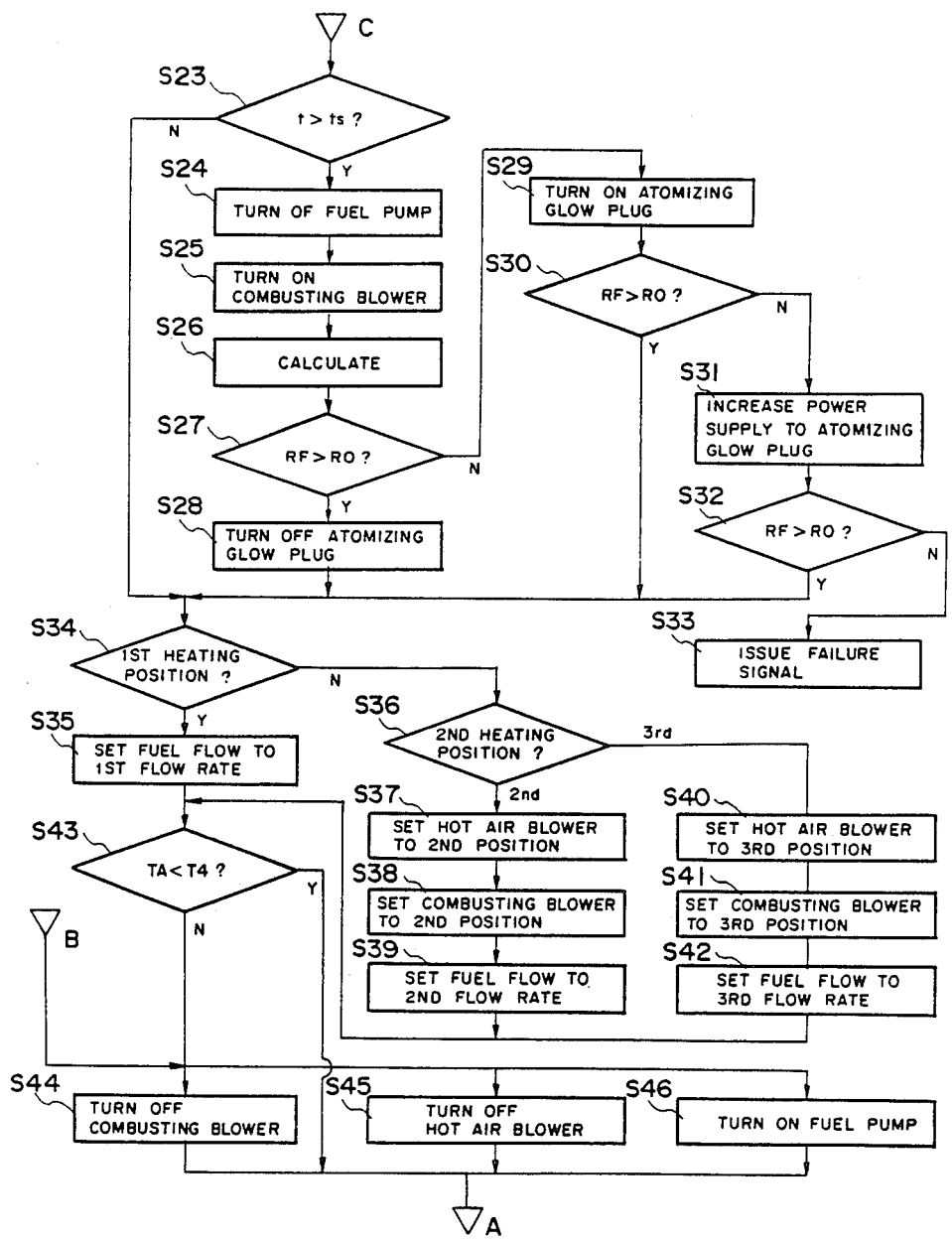

FIGS. 2(A) and 2(B) are a flowchart of an operation senquence of the control device of the present invention. Operation of the device will be described with reference to FIGS. 1 and 2(A), 2(B).

The key switch 66 is turned on to supply electric power from the battery 68 to the electronic control unit 6, and the key switch 66 is further turned to the start position to energize the starter motor for thereby starting the engine 1 in a step 1. A step 2 then reads the cooling water temperature $T_W$ from the water temperature sensor 6 and ascertains whether the cooling water temperature has reached a prescribed temperature $T_1$ at which the cooling water is usable for heating the compartment. If the cooling water temperature is below the temperature $T_1$, then control goes from the step S2 to a step S3.

The step S3 checks the resistance value R of the igniting glow plug 43 based on a signal from the plug resistance detector 64. If the resistance value R is higher than a prescribed resistance value $R_1$, i.e., the temperature in the burner 4 is high due to the after heat, control goes to a step S6 which reads a signal $T_{AM}$ from the atmospheric temperature sensor 63 and checks if the atmospheric temperature signal $T_{AM}$ is higher or lower than a prescribed temperature $T_2$. If the atmospheric temperature $T_{AM}$ is higher than the prescribed temperature $T_2$, then the igniting glow plug 43 is energized in a step 7. Since the fuel can well be ignited even if the atomizing glow plug 421 is not heated, control jumps to a step 10 without energizing the atomizing glow plug 421.

If the resistance value R of the igniting glow plug 43 is lower than $R_1$ in the step 3, the igniting glow plug 43 is energized in a step 4 since it is presumed that the temperature in the combustion chamber 41 is low, and the atomizing glow plug 421 is normally energized and heated in a step 5.

If the atmospheric temperature $T_{AM}$ is lower than the prescribed temperature $T_2$ in the step 6, then control goes to a step 8 in which the igniting glow plug 43 is turned on, and then the atomizing glow plug 421 is normally energized in a step 9. Therefore, fuel can sufficiently be atomized even if the temperature of combusting air is low.

In steps 10, 11, the fuel control valve 46 is opened to supply fuel into the burner 4 through the atomizing glow plug 421, and the combusting air blower 40 is driven to force combusting air into the burner 4. A step 12 ascertains whether the key switch 66 is in the start position or not. If the key switch 66 is in the start position in the step 12, then the engine load condition is checked by the load sensor 13 in a step 13. If the engine load L is lower than a prescribed load level La in the step 13, the heating position is checked in a step 14. If the heating position switch 61 is turned on, a step 15 ascertains whether the heat exchanger temperature $T_{HE}$ as detected by the heat exchanger temperature sensor 51 is higher than a prescribed temperature $T_5$. If the heat exchanger temperature $T_{HE}$ is higher than the prescribed temperature $T_5$, then control goes to a step 16 in which the hot air blower 52 is energized to start supplying air. If the key switch 66 is not in the start position in the step 12, if the engine load is higher than the load level La in the step 13, if the heating position switch 61 is turned off in the step 14, or if the heat exchanger temperature is lower in the step 15, then control goes to a flow for stopping the operation of the burner.

After the hot air blower 52 has been operated in the step 16, the operating time of the burner is counted in a step 17. A step 18 then checks a signal $T_{FS}$ from the flame sensor 44 on the burner 4. If the burner temperature is higher than a prescribed temperature T, then control goes to a step 23 since the combustion condition is good. If lower than the temperature T, then control proceeds to a step 19 in which a prescribed operating time is set to N. If the operating time N is 3N or more in a step 20, then an failure signal is generated to issue a signal to turn off the emergency switch 65 (steps 21, 22).

If the time ts in which the burner 4 operates to burn the fuel is longer than a prescribed time t in the step 23, then control goes to a step 24 as it is assumed that the combustion condition is stable. If the time ts has not reached the time t, then the fuel pump 45 is controlled to supply fuel in the step 24, and the combusting air blower 40 is controlled to supply air for combustion in a step 25 to activate the combustion in the burner 4. These operations are calculated and a signal RF from the flame sensor 44 is checked (steps 26, 27). The signal $R_F$ from the flame sensor 44 which corresponds to the temperature in the burner 4 is compared with a prescribed temperature signal $R_O$. If the signal $R_F$ is higher than signal $R_O$, then control proceeds to a step 28 in which the atomizing glow plug 421 is turned off because the combustion in the combustion chamber 41 is active and the fuel can easily be atomized. If the signal $R_F$ is lower than $R_O$, control goes a step 29 in which the atomizing glow plug 421 is energized to assist in atomizing the fuel for activating fuel combustion. A next step 30 compares the signal $R_F$ from the flame sensor 44 with the prescribed temperature $R_O$. If $R_F > R_O$, i.e., the temperature $R_F$ in the combustion chamber 41 is higher than the prescribed temperature $R_O$, then control goes to a step 34. If the temperature $R_F$ is lower than $R_O$ because of an atomization failure due to a high atomizing temperature of fuel having different atomizing performance, then electric power supplied to the atomizing glow plug 42 is increased, the signal $R_F$ is checked, and a failure signal is generated if the condition $R_F > R_O$ is not reached (steps 30, 31, 32, 33).

In the step 34, a signal from the heating position switch 61 which has been set to a desired heating temperature is read. If the heating position switch 61 is in the first position, then the fuel control valve 46 is controlled at a first flow rate in a step 35. If the heating position switch 61 is in the second position, then the hot air blower 52, the combusting air blower 40, and the fuel control valve 46 are controlled at a second flow rate to increase the fuel and air supply to the burner 4 and also the hot air discharged from the heat exchanger 5 for thereby increasing the temperature in the vehicle cabin (steps 36 through 39).

If the heating position switch 61 is in the third position in the step 36, then the hot air blower 52, the combusting air blower 40, and the fuel control valve 46 are controlled by the switch device 8 at a third flow rate to discharge hot air via the outlet 54 into the cabin in maximum operation (steps 40 through 42).

If the temperature $T_A$ of the discharged hot air is higher than prescribed hot air temperatures $T_4$ corresponding respectively to the frst, second, and third fuel rates in a step 43, then control goes to steps 44, 45, 46 in which operation of the combusting air blower 40, the hot air blower 52, and the fuel pump 45 is temporarily interrupted, and then control returns to the step 2. Then, the above flow is repeated.

In the above embodiment, as described above, the combustion condition in the combustion chamber 41 of the burner 4 is checked according to the electric resistance of the flame sensor 44 in the combustion chamber 41 while the heater is in operation. Based on the detected combustion condition, the supply of electric power to the atomizing glow plug 421 of the fuel atomizer 42 is controlled in order to allow the fuel to be well atomized and combusted. Therefore, even if fuel of a type which can be atomized in a different condition is used, the fuel can well be combusted since atomizing assistance is adjusted according to the combustion condition of the fuel.

Although a certain preferred embodiment has been shown and described, it should be understood that many changes and modifications may be made therein without departing from the scope of the appended claims.

What I claim is:

1. An apparatus for controlling fuel combustion in a heater including a burner having a fuel atomizer for heating and atomizing fuel and igniting means for igniting the fuel atomized by the fuel atomizer, said apparatus comprising:

a flame sensor disposed within said burner producing a signal indicative of a temperature condition of fuel combustion in said burner; and control means, operable in response to the flame sensor signal, for controlling an amount of heating energy for heating fuel in said fuel atomizer.

2. An apparatus according to claim 1, wherein said fuel atomizer has a glow plug which is heatable when electrically energized.

3. An apparatus according to claim 2, wherein said glow plug includes a resistive body having a positive temperature coefficient of resistance.

4. An apparatus according to claim 2, wherein said glow plug comprises a body made of a ceramic material and a resistive member embedded in said body.

5. An apparatus according to claim 1, wherein said flame sensor comprises a positive resistive body having a temperature coefficient of resistance.

6. An apparatus according to claim 2, wherein electrical power supplied to the fuel atomizer glow plug is controlled by the control means.

7. An apparatus according to claim 1, wherein said igniting means including a glow plug which is heatable when electrically energized.

8. An apparatus according to claim 7, wherein said fuel atomizer has a glow plug which is heatable when electrically energized, and wherein the atomizer glow plug and the ignition glow plug are controlled by the control means.

9. An apparatus according to claim 1, wherein the control means includes comparison means for comparing the flame sensor signal to a stored prescribed signal and outputting a control signal based on the comparison.

* * * * *

UNITED STATES PATENT AND TRADEMARK OFFICE
CERTIFICATE OF CORRECTION

PATENT NO. : 4,778,377

DATED : October 18, 1988

INVENTOR(S) : HIDEO KAWAMURA

It is certified that error appears in the above-identified patent and that said Letters Patent is hereby corrected as shown below:

Column 2, line 61, "disopsed" should be --disposed--.

Column 3, line 20, "11 is generator" should be --A generator 11 is--;
"engine a" should be --1. A--;
line 21, "detector" should be --detects--;
line 22, "13" (first occurrence) should be --and--;
line 23, "engine an" should be --engine 1. An--.

Column 5, line 13, "RF" should be --$R_F$--.

Column 6, line 43, delete "positive";
line 44, after "a" insert --positive--.

Signed and Sealed this

Seventh Day of February, 1989

Attest:

DONALD J. QUIGG

Attesting Officer

Commissioner of Patents and Trademarks